Oct. 18, 1955  J. A. WHITE, JR  2,720,716
FINISH LEVELER WITH AUTOMATIC SCRAPER ADJUSTING MECHANISM
Filed May 4, 1953
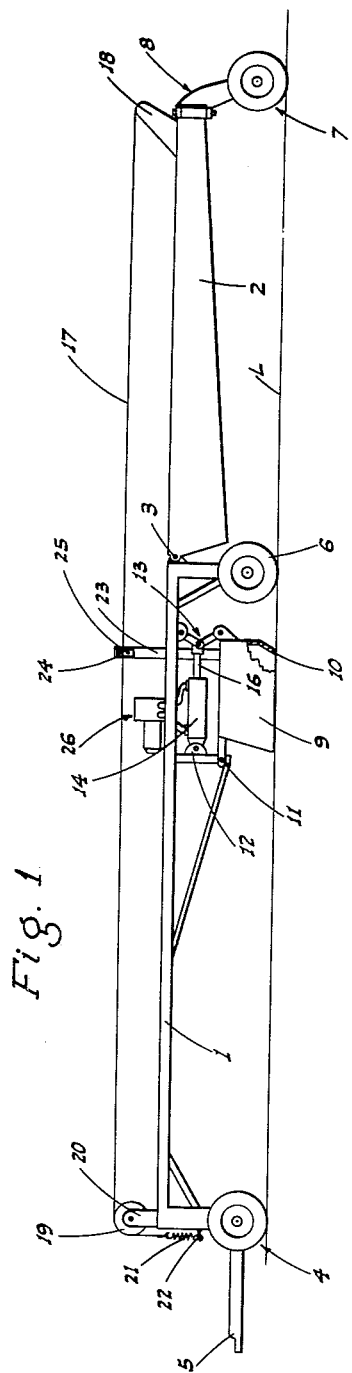
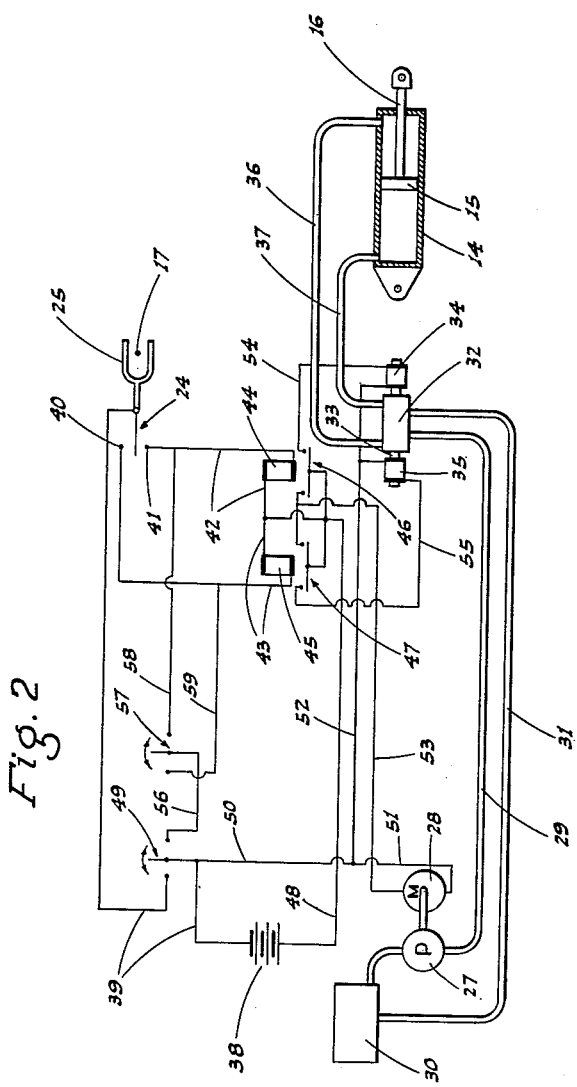
INVENTOR
John A. White Jr.
BY
[signature]
ATTORNEYS

United States Patent Office 2,720,716
Patented Oct. 18, 1955

2,720,716

FINISH LEVELER WITH AUTOMATIC SCRAPER ADJUSTING MECHANISM

John A. White, Jr., Gilroy, Calif., assignor to Be-Ge Manufacturing Co., Gilroy, Calif., a corporation of California Application May 4, 1953, Serial No. 352,625

7 Claims. (Cl. 37—153)

The present invention is directed to, and it is a major object to provide, an improved finish leveler; i. e. an elongated scraping implement adapted for use to level the earth in fields after initial working thereof, and preparatory to planting of a crop.

This type of earth working implement includes generally an extremely elongated, intermediately articulated frame assembly having a vertically adjustable scraper suspended therefrom intermediate its ends; the ends of the frame assembly being carried by wheels, and—for the accomplishment of accurate leveling as the implement traverses uneven ground—it is requisite that the scraper be adjusted up or down in order to maintain its cutting edge at a point lying in a straight line taken between the points of contact with the ground of said end wheels.

It is therefore another important object of this invention to provide a novel mechanism for automatically adjusting the scraper up or down for the above purpose; such mechanism including instrumentalities responsive to the relative rise or fall between the end wheels and scraper, and power means being provided to translate such response of the instrumentalities into compensating adjusting movements of the scraper.

Another object of the present invention is to provide an automatic scraper adjusting mechanism, as in the preceding paragraph, wherein such instrumentalities include a taut wire connected to opposite ends of the articulated frame assembly and extending unobstructed between such ends; there being a scraper-supported, normally open, two-way switch having actuating elements above and below the taut wire whereby, upon relative rise or fall between the wire and switch—resulting from the scraper being too high or too low with respect to the aforesaid straight line—the corresponding switch element is engaged and moved so as to close the switch on one side or the other. The power means is electrically controlled, and closing of such two-way switch on one side or the other causes operation of the power means to adjust the scraper in one direction or the other to return it to proper position, with its cutting edge on said straight line; the taut wire then being clear of said switch elements, the switch open, and the power means inactive. The scraper remains in each position of adjustment until ground undulations again cause the scraper adjusting mechanism to automatically function.

A further object of this invention is to provide a finish leveler with automatic scraper adjusting mechanism which functions smoothly, positively, and in a manner to assure of the necessary adjustment of the scraper within very close working limits.

It is also an object of the invention to provide, in a finish leveler, automatic scarper adjusting mechanism which is designed for ease and economy of manufacture and installation.

Still another object of the invention is to provide a practical and reliable finish leveler with automatic scraper adjusting mechanism, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation, somewhat diagrammatic, showing a finish leveler embodying the present invention.

Fig. 2 is a diagram showing the mechanism, including the electric control circuits.

Referring now more particularly to the characters of reference on the drawings, the invention is embodied in a finish leveler which includes an elongated front longitudinal frame 1 and an elongated rear longitudinal frame 2; such frames being pivoted together at adjacent ends, as at 3, for relative vertical articulation. When the longitudinal frames 1 and 2 are pivotally connected together, as above, they comprise an extremely elongated frame assembly.

The front frame 1 is supported, at its forward end, by a swivelly mounted front wheel truck which includes a tongue 5 adapted to hitch the implement to a tractor in draft relation.

At its rear end the front frame is supported by a pair of transversely spaced wheels 6, while the rear end of the rear frame 2 is supported by a wheel truck 7 caster-mounted as at 8.

A transversely extending drag type scraper 9 is disposed below the front frame 1 immediately ahead of the wheels 6, and such scraper includes a cutting edge 10.

The scraper 9 is suspended at the front, as at 11, from a fixed bracket 12 on the frame 1, while said scraper 9 is suspended at the rear from the frame 1 by a toggle linkage 13.

A double-acting power cylinder 14 of fluid pressure controlled type is connected between the bracket 12 and the toggle linkage 13; the power cylinder 14 including a piston 15 and a piston rod 16.

Upon operation of the power cylinder 14 to expand the same, the toggle linkage 13 causes lowering of the scraper 9, whereas operation of said cylinder to contract the same causes the toggle linkage 13 to raise the scraper. In this manner appropriate operation of the double-acting power cylinder 14 is effective to set or maintain the cutting edge 10 of the scraper 9 on a straight line L drawn between the point of ground contact of the front and rear wheels 4 and 7, respectively, and which is necessary for the implement to accomplish proper leveling of the earth over which it is traveling.

Upon the front wheels 4 or the rear wheels 7 rising or falling—by reason of ground contours—relative to the cutting edge 10, such edge no longer lies on the aforesaid straight line L between the front and rear wheels, and hence up or down adjustment of the scraper 9 is necessary in order to attain continued proper leveling action of the implement. Such up or down adjustment of the scraper 9 is accomplished automatically, and in response to such relative rise or fall of the wheels 4 or 7 relative to the cutting edge 10, by the following mechanism:

A taut longitudinal wire 17 extends above the frame assembly from end to end thereof; the rear end of such wire being anchored to a post 18 which upstands from the rear end of frame 2.

At its forward end portion the wire 17 turns over a sheave 19 on a post 20 which upstands from the forward end of the frame 1; the wire 17 extending downwardly a short distance from the sheave 19 and there being connected to a loaded tension spring 21 anchored, as at 22, to the frame 1. The spring 21 serves to maintain the wire 17 taut during articulating movements between the frames 1 and 2.

A post 23 is fixed on the scraper 9 and upstands, in clearance relation to the frame 1, to a point alongside the wire 17.

A two-way, normally open, micro-switch 24 is mounted on the post 23 immediately adjacent the wire 17, and such switch includes a transversely extending, vertically movable, switch actuating fork 25 between which the wire 17 normally extends in clearance relation; i. e. the fork legs normally lie in clearance relation above and below said wire 17.

The micro-switch 24 is operative, through the medium of the circuit arrangement hereinafter described, to control an electrically actuated, valve regulated, fluid pressure supply unit, indicated generally at 26, and which unit is mounted on the frame 1.

The electrically actuated valve regulated fluid pressure supply unit 26 includes, within the housing thereof, a hydraulic pump 27 driven by an electric motor 28; such pump being interposed in a feed conduit 29 which leads from a hydraulic reservoir 30.

A return conduit 31 also connects in communication with the reservoir 30; the feed conduit 29 and return conduit 31 being connected in communication, at their other ends, with a four-way reversing valve 32 of a type which is normally maintained spring-closed, but which includes a plunger 33 having solenoids 34 and 35 associated with the opposite and outer ends thereof.

Conduits 36 and 37 lead from the reversing valve 32 to opposite ends of the power cylinder 14. When the solenoid 34 is energized, the valve 32 is shifted to a position to connect feed conduit 29 with conduit 36, and to connect return conduit 31 to conduit 37. This results in the piston 15 and piston rod 16 retracting, which raises the scraper 9. Actuation of the solenoid 35 shifts the valve 32 to a reverse position, whereupon feed conduit 29 is placed in communication with conduit 37, and return conduit 31 is placed in communication with conduit 36. This causes the power cylinder 14 to expand and lowers the scraper 9. When neither of the solenoids 34 or 35 are energized, the valve 32 lies wholly closed, with no fluid transfer therethrough; the cylinder 14 and scraper 9 then being held in a fixed position.

The electrical control circuit between the two-way micro-switch 24 and the solenoids 34 and 35 comprises the following:

A source of electrical current, such as the generator-battery unit 38 of the tractor, is connected on one side by a main lead wire 39 which extends to the common terminal of the micro-switch 24. The separate contacts 40 and 41 of the two-way micro-switch 24 are connected to one side of energizing circuits 42 and 43 for the solenoids 44 and 45 of normally open relay switches 46 and 47; the solenoids 44 and 45 being connected in common on the side opposite the switch 24, and such common connection includes the other main lead wire 48 which extends from the source 38 of electrical energy.

The numeral 49 includes a manual two-way switch which is interposed in the main lead wire 39, and is normally closed with respect to said wire so that there is a direct feed from the source 38 of electrical energy to the central or common terminal of the two-way micro-switch 24.

Additionally, the main lead wire 39 has a branch 50 which leads off between the source 38 of electrical energy and the switch 49; such branch 50 being forked, with one fork 51 leading to one side of the electric motor 28, and the other fork 52 leading to connection in common with one side of the solenoids 34 and 35.

The relay switches 46 and 47 have their central or common terminal connected to the main lead wire 48, while the separate contacts of said relay switches 46 and 47 have corresponding ones thereof connected in common by a lead 53 to the motor 28 opposite the branch 51.

The remaining separate contact of the relay switch 46 is connected by a lead 54 to solenoid 34, while the remaining separate contact of relay switch 47 is connected by a lead 55 to solenoid 35.

The above described circuit arrangement functions to the accomplishment of the desired end in the following manner:

Upon the cutting edge 10 of the scraper 9 occupying a position below the straight line L, as by reason of the front or rear wheels, 4 or 7, traversing a high spot in the ground contour, the taut wire 17 will rise in the fork 25, swinging the latter upwardly and closing the micro-switch 24 with the contact 41, resulting in solenoid 44 closing relay switch 46. When relay switch 46 closes, solenoid 34 is energized, with resultant operation of the valve 32 and power cylinder 14 in a direction to raise the scraper 9 and cutting edge 10—in the manner previously described—until said cutting edge again lies on the straight line L, and at which time the switch 24 returns to its neutral or open position, with the valve 32 closed holding the power cylinder 14 in a fixed position.

Conversely, when the cutting edge 10, by reason of ground contours, lies above the straight line L, the taut wire 17—by reason of the drop at the wheels 4 or 7—engages and swings the fork 25 downwardly, closing the micro-switch 24, with its contact 40 energizing solenoid 45, which in turn closes relay switch 47. When relay switch 47 is closed, the solenoid 35 is energized; this working the valve 32 in the direction which causes the power cylinder 14 to lower the scraper 9 until the cutting edge 10 again lies on the straight line L.

It should be noted that when either the relay switch 46 or the relay switch 47 is brought into play for the purpose of energizing the solenoid 34 or the solenoid 35, respectively, the electric motor 28—by reason of the parallel circuit connections thereto, including leads 52 and 53—is placed in operation, whereby to energize the pump, whence fluid pressure is made available at the valve 32 to work the cylinder 14 in response to movements of valve 32 by said solenoids.

As soon as the micro-switch 24 and the switch 46, or the switch 47, opens, the motor 28 is deenergized and so remains until the circuit is again brought into play.

From the foregoing it is evident that the present invention provides a very effective automatic adjusting mechanism for the scraper 9; the mechanism normally and without manual attendance causing a compensating adjustment of the scraper up or down—as the case may be—to return the cutting edge to the straight line L whenever the contour of the ground over which the wheels are traveling causes the cutting edge to assume a position out of said straight line. As the scraper 9 is disposed substantially centrally between the forward and rear ends of the frame assembly, the mechanism in its functioning accomplishes a vertical compensating adjustment of said scraper which is approximately one-half of the relative rise or fall between the wheels at opposite ends of the frame assembly. With this extent of compensating adjustment, and as the scraper 9 lies centrally of the ends of the frame assembly, each adjustment—either up or down—returns the cutting edge 10 to substantially the straight line L.

Under certain conditions it may be desired to control the described mechanism manually, and to this end the circuit includes the following:

When the manual two-way switch 49 is swung from its normal position providing continuity in the main lead wire 39, to the other position, such lead wire 39 is connected with a wire 56 which leads to the central or common terminal of a separate manual two-way switch 57 which is normally open. The separate terminals of the two-way switch 57 are connected by wires 58 and 59 with corresponding leads of the energizing circuit 42 of solenoid 44, and the energizing circuit 43 of solenoid 44. With switch 49 in said other position, and by closing the manual two-way switch 57 in one direction or the other, the solenoid 44 may be energized to close the relay switch 46, or the solenoid 45 energized to close the relay switch 47; both with the same results as attained when said solenoids are closed in response to corresponding closing of the micro-switch 24, i. e. the power cylinder 14 is caused to operate in one direction or the other to raise or lower the scraper 9. The manual two-way switch 57 is preferably mounted on the tractor with a suitable extension cord running rearwardly to the implement.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a finish leveler which includes an elongated frame wheel-supported at its ends and comprising front and rear sections hinged together for relative vertical movement, a vertically adjustable scraper suspended from the frame intermediate its ends, and a power device connected between the frame and scraper to vertically adjust the latter; an automatic mechanism for controlling said power device and comprising an electrically controlled reversible device operative to cause the power device to function to adjust the scraper up or down; a reversing circuit for said reversible device including a two-way switch, and means responsive to relative rise and fall between the wheels and scraper operative to close said switch one way or the other, respectively, so as to close the circuit on the related side and said devices cause the power device to effect a compensating vertical adjustment of the scraper; said responsive means including a taut wire extending lengthwise of the scraper, and means securing the wire at the ends to the frame at points beyond and on opposite sides of the axis of articulation of said frame sections; the switch including a member positioned to be engaged and moved up or down by the wire intermediate the ends of the latter.

2. A mechanism, as in claim 1, with a part fixed on the scraper and extending to adjacent the wire, the switch being mounted on said part.

3. In a finish leveler, an articulated frame assembly including a front longitudinal frame and a rear longitudinal frame pivotally connected at adjacent ends for relative vertical motion, wheels supporting the frame assembly at the outer ends and the front frame at the rear end, a scraper vertically adjustably suspended from the front frame adjacent its rear end, a reversible power device connected between the front frame and scraper operative to adjust the latter up or down, a taut wire extending lengthwise of the frame assembly and anchored at the ends to corresponding frames, a post upstanding from the scraper to adjacent the wire, a movable element on the post adapted to be engaged and moved up or down by the wire upon relative rise and fall between the wheels at the ends of the frame assembly and said scraper, and means operative by movements of said element arranged to cause actuation of said reversible power device in a direction to effect compensating vertical adjustment of the scraper.

4. In a finish leveler, an articulated frame assembly including a front longitudinal frame and a rear longitudinal frame pivotally connected at adjacent ends for relative vertical motion, wheels supporting the frame assembly at the outer ends and the front frame at the rear end, a scraper vertically adjustably suspended from the front frame adjacent its rear end, a reversible power device connected between the front frame and scraper operative to adjust the latter up or down, a taut wire extending lengthwise of the frame assembly and anchored at the ends to corresponding frames, a post upstanding from the scraper to adjacent the wire, a two-way switch on the post adjacent the wire, said switch including a fork straddling the wire from one side, said fork being engaged and moved up or down, and the switch correspondingly worked, upon rise or fall of the scraper relative to the wheels at the ends of the frame assembly, and electromechanical means, including a reversing circuit in which the switch is interposed, operative to cause the power device to effect a compensating vertical adjustment of the scraper when the switch is so worked by the fork.

5. In a finish leveler, an articulated frame assembly including a front longitudinal frame and a rear longitudinal frame pivotally connected at adjacent ends for relative vertical motion, wheels supporting the frame assembly at the outer ends, and the front frame at the rear end, a scraper vertically adjustably suspended from the front frame adjacent its rear end, a double acting fluid pressure power cylinder connected between the front frame and scraper to vertically adjust the latter, a fluid pressure supply system for said power cylinder, said system including an electrically actuated reversing valve, a taut wire extending lengthwise of the frame assembly, means anchoring said wire at its ends to opposite end portions of said frame assembly, a post upstanding from the scraper to adjacent the wire, a reversing switch mounted on the post and including an element engaged by the wire upon relative rise or fall between the same and the post whereby to reversibly actuate said switch, and a reversing circuit between the switch and said electrically actuated reversing valve, whereby reverse actuation of the switch causes corresponding actuation of the valve so that the power cylinder effects adjustment of the scraper to compensate for relative rise and fall between the latter and the wheels at the end of the frame assembly.

6. A finish leveler, as in claim 5, in which said anchoring means at one end of the wire includes a tension spring.

7. A finish leveler, as in claim 5, including a post upstanding from the frame assembly at each end thereof, the wire being anchored at one end to the corresponding post, the other post having a transverse axis sheave thereon and the wire turning over said sheave and extending downwardly, and a tension spring connected between the downwardly extending portion of the wire and an adjacent part of the corresponding frame.

References Cited in the file of this patent

UNITED STATES PATENTS

| | | |
|---|---|---|
| 2,043,413 | Knox et al. | June 9, 1936 |
| 2,503,638 | Shuey | Apr. 11, 1950 |
| 2,636,290 | Bell | Apr. 28, 1953 |
| 2,659,166 | Mathias | Nov. 17, 1953 |